United States Patent [19]
Wilcher

[11] Patent Number: 6,019,892
[45] Date of Patent: Feb. 1, 2000

[54] GUIDE TRACKING FOR COG RAKE BAR SCREENS

[75] Inventor: Stephen B. Wilcher, Harleysville, Pa.

[73] Assignee: United States Filter Corporation, Lowell, Mass.

[21] Appl. No.: 09/122,574

[22] Filed: Jul. 24, 1998

Related U.S. Application Data

[63] Continuation-in-part of application No. 08/786,059, Jan. 21, 1997, abandoned.

[51] Int. Cl.[7] .................................................. B01D 29/64
[52] U.S. Cl. ......................... 210/159; 74/89.17; 74/422; 210/162; 210/236; 210/413; 254/95
[58] Field of Search ..................................... 201/158, 159, 201/161, 162, 85, 86, 232, 236, 400, 401, 413; 74/89.17, 422, DIG. 10; 254/95

[56] References Cited

U.S. PATENT DOCUMENTS

| | | | |
|---|---|---|---|
| 3,591,006 | 7/1971 | Daferner | 210/159 |
| 4,645,598 | 2/1987 | Hannum | 210/232 |
| 4,780,199 | 10/1988 | Ezzell et al. | 210/159 |
| 4,919,825 | 4/1990 | Croket | 210/783 |
| 5,246,573 | 9/1993 | Lodholz et al. | 210/159 |
| 5,426,820 | 6/1995 | Coleman et al. | 16/85 |
| 5,468,391 | 11/1995 | Wilcher | 210/525 |
| 5,620,601 | 4/1997 | Wilcher et al. | 210/525 |
| 5,885,458 | 3/1999 | Wilcher et al. | 210/525 |

Primary Examiner—Peter A. Hruskoci
Attorney, Agent, or Firm—Michael Best & Friedrich LLP

[57] ABSTRACT

There is provided a guide track for cog rake bar screens comprising a metallic or nonmetallic guide track. There is also provided a guide track for cog rake bar screens comprising modular sections of guide track being disposed adjacent one another wherein guide rollers are guided within the guide track.

17 Claims, 7 Drawing Sheets

GUIDE TRACKING FOR COG RAKE BAR SCREENS

BACKGROUND OF THE INVENTION

This application is a continuation-in-part application of U.S. Ser. No. 08/786,059, filed Jan. 21, 1997 now abandoned.

1. Field of the Invention

This invention relates to cog rake bar screens and more particularly to guide tracking for cog rake bar screens.

2. Description of Related Art

Cog rake bar screens are typically used in municipal and industrial coarse screening applications. The primary purpose of these screens is to retain and remove debris from channeled water flowing into water treatment plants, industrial sites, drainage facilities or overflow control facilities. Usually operated on float controls or timers, these screens periodically remove debris that has accumulated on the upstream side of a bar rack mounted in the waste stream. However, these screens are often located in highly corrosive environments. As a result, the frame materials may need to be covered by rather expensive coating systems or the finish may be required to be manufactured from 304 or 316 stainless steel which may add dramatically to the cost of the machine. It is therefore desirable to have guide tracking for cog rake bar screens made from materials which may be less expensive yet still operate satisfactorily in such corrosive environments.

Further, because cog rake machines utilize guide tracking and may make use of involute gearing and pin racks, they may require weldments internal to the side frames for the roller bearing guide tracking. During manufacturing, all guide tracking is generally shop fit and accurately welded into place inside the main side frame. If the frames are not accurately manufactured, the cog rake drive carriage operating within the guide track may run very rough, vibrate significantly, or worse, potentially jam. If these machines do not run smoothly, then the excess vibration cannot only cause high stress loading on the sub-assemblies of the main rake carriage which operates within the guides, but can also lead to problems with the engagement of the drive carriage mounted rake teeth as they enter into the bar rack. Excess vibration may also cause the drive carriage mounted rake teeth to loose the debris the unit is attempting to remove.

Typically, manufacturers require heavy greasing of the tracking runs to allow for smooth operation of the drive carriage mounted bearing assemblies. This can become maintenance intensive as many times the grease can get washed out or even entrap other solids. If excess wear should take place within any area of the side frame tracking system, replacement of the entire side frame becomes necessary due to the construction of the frame as one complete unit. If the machines are made of carbon steel, they may require sandblasting and painting. However, during painting, excess paint runs, sags, or drips may get inside the guide tracks leading to loss of tolerances. As a result, potential jamming of the cog rake drive carriage may occur. Therefore, because tolerances may become critical in these weldments, it is desirable to have guide tracking for cog rake bar screens which may be more easily manufactured, which may require less maintenance, and which may be corrosion resistant.

SUMMARY OF THE INVENTION

There is provided a guide track for cog rake bar screens comprising modular sections of metallic or nonmetallic guide track being disposed adjacent one another and supporting guide rollers for movement along the guide track.

DESCRIPTION OF THE PREFERRED EMBODIMENTS

Figure 1:
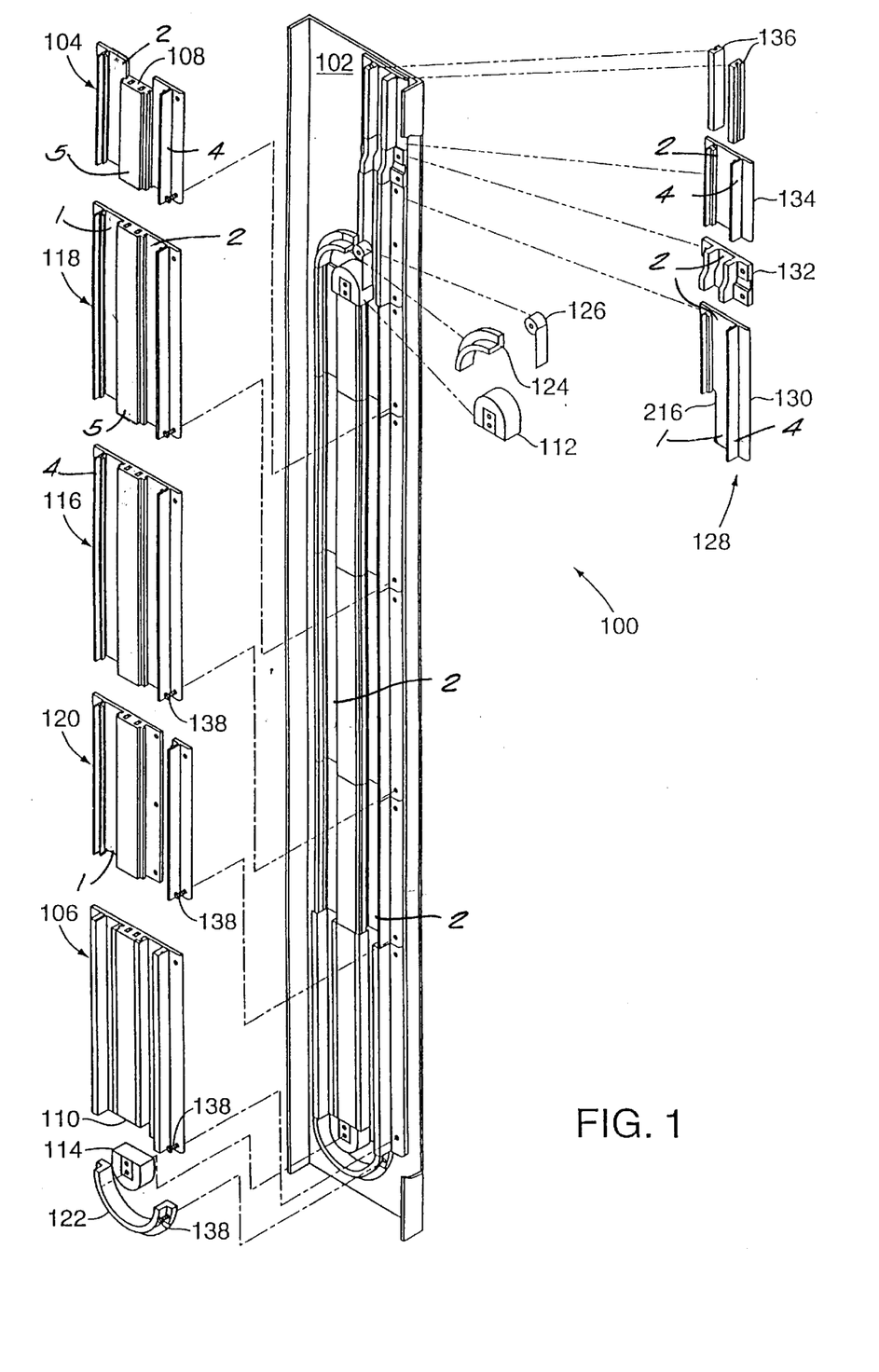
FIG. 1 is a perspective view of a first preferred embodiment of a guide tracking for a cog rake bar screen.

Referring now to FIG. 1, there is shown a perspective view of a guide tracking 100 for a cog rake bar screen. A similar view would be disposed at the opposing side of the cog rake bar screen. The guide tracking 100 preferably comprises sections or modules which may be secured to a side frame 102. A typical cog rake bar screen is shown and described with reference to FIG. 9. For a more complete description of a typical cog rake bar screen, refer to U.S. Pat. No. 5,246,573, which is hereby incorporated by reference.

Specifically, the modular guide tracking assemblies 100 may comprise an upper pin module 104 and a bottom pin module 106. The upper module 104 and lower module 106 preferably have slots 108 and 110 for receiving track rounds 112 and 114, respectively. The guide tracking 100 may further comprise one or more standard intermediate modules 116. The guide tracking may also comprise one or more variable intermediate modules 118. Moreover, the guide tracking 100 may comprise one or more standard removable modules 120. Modular Sections 104, 106, 116, 118 and 120 each may contain two spaced apart external ribs 4 extending from a flat surface of the respective flat modular section. In between the spaced apart external ribs 4, may be a center rib 5 also extending from the surface at the selected section. The external ribs 4 and center rib 5 define elongated channels 2 in each modular section 104, 106, 116, 118, and 120. The channels 2 provide a path for guide rollers 304 (shown and described with reference to FIG. 6) such that the guide rollers 304 move within the guide tracking 100. Movement of the guide rollers 304 within the channels 2 contributes to the overall operation of the cog rake bar screen as described in U.S. Pat. No. 5,246,573.

A bottom tracking ring 122 is disposed below the bottom module 106 and the width of the track (i.e., between the bottom tracking ring 122 and the track round 114) is preferably the same width as the track width for the other modules 104, 106, 116, 118, and 120. A top tracking ring 124 as well as a flap plate 126 are disposed above the upper module 104. The width of the track between the top tracking ring 124 and the track round 112 is preferably also the same as the track width for the other modules. Further, the flap plate 126 should be positioned to allow the drive shaft mounted guide roller to complete the desired circular path as will be described and to prevent the follower roller 150 (see FIG. 9) of the guide shaft from entering the circular path of the drive shaft roller, as generally understood by those skilled in the art.

The guide tracking 100 also comprises an upper track section 128. The upper track section 128 may comprise a bridging track module 130, a molded track offset 132, and one or more upper track modules 134. The upper track section 128, module 130, track offset 132, and track modules 134 may each contain ribs 4 and elongated channels 2 similar to those described in relation to modules 104, 106, 116, 118 and 120. As is know in the industry, the track offset 132 is used to allow a cog rake to dump the waste discharge.

Wear bars 136 may be secured to the extensions in modules as will be described. For purposes of clarity, the bottom module 106 and upper track module 134 in FIG. 1 are shown having the wear bars 136 inserted. Further, each of the modules 104, 106, 116, 118, 120, 130, 134, upper track section 128, the track rounds 112, 114, the tracking rings 122, 124, flap plate 126, and offset track 132 may be secured to the side frame 102 via bolts 138.

Side frame 102 is part of a cog rake bar screen as shown and described hereinafter with reference to FIG. 9. The side frame 102 is generally a flat planar surface. As shown in FIG. 1, various modular sections and other components of the guide tracking 100 are attached to the side frame 102. As can be seen with regards to FIG. 1, the various components are arranged in a linear fashion, each component adjacent to the next component.

Figure 2:
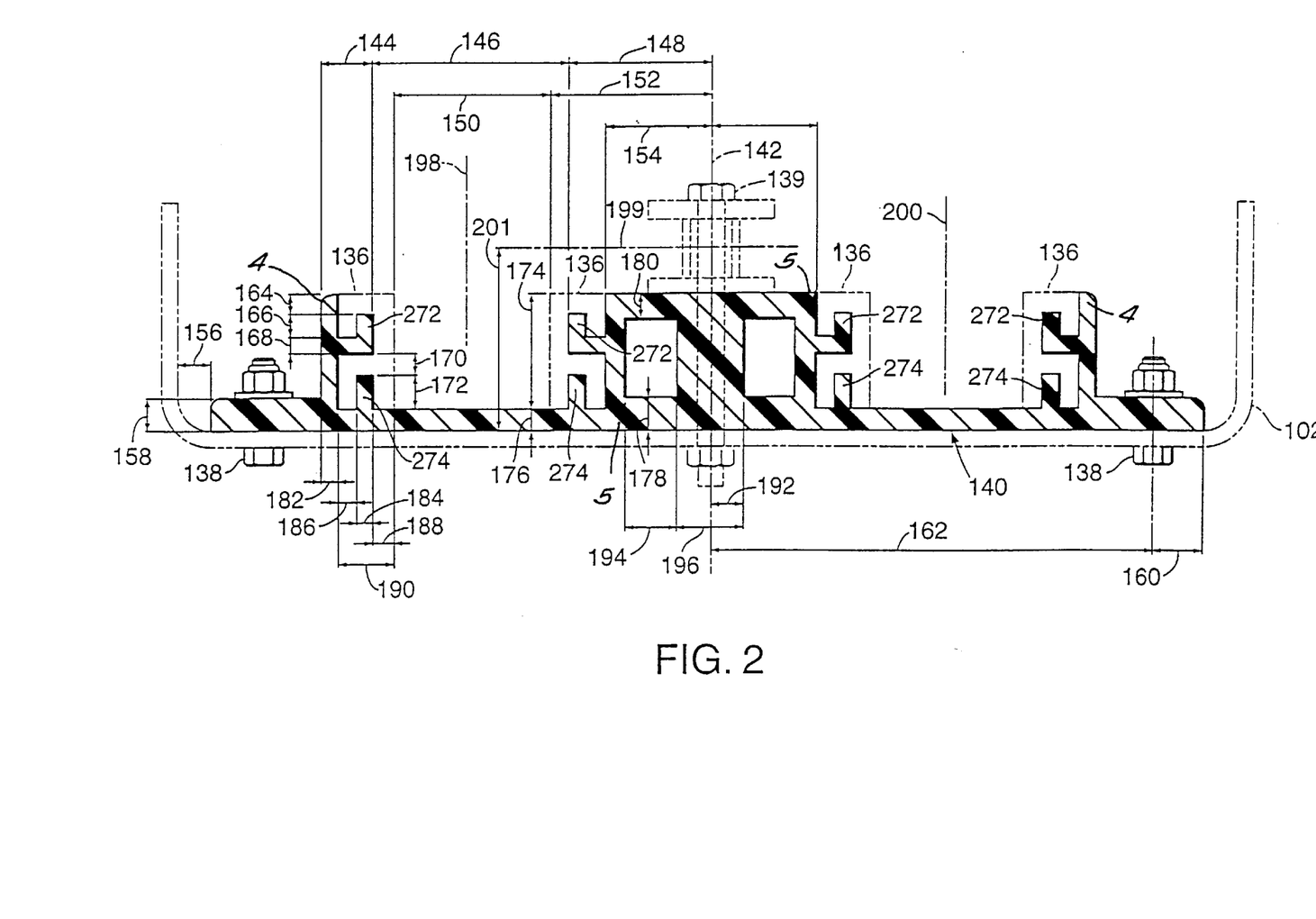
FIG. 2 is a cross sectional view of a cog screen track and side frame.

Referring now to FIG. 2, there is shown a cross sectional view of the cog screen track 140 and side frame 102. The cross sectional view of the cog screen track shown in FIG. 2 preferably applies to the track disposed in bottom module 106, upper module 104, standard intermediate module 116, and variable intermediate module 118. The track 140 may be symmetric about center line 142.

The track 140 may, for example, have a dimension 144 of 1.1875 inches, a dimension 146 of 4.40625 inches, a dimension 148 of 3.25 inches, a dimension 150 of 3.53125 inches, a dimension 152 of 3.6875 inches, a dimension 154 of 2.4375 inches, a dimension 156 and 158 of 0.75 inches, a dimension 160 of 1.1875 inches, a dimension 162 of 10.21875 inches, a dimension 164 of 0.4375 inches, a dimension 166 of 0.5 inches, a dimension 168 of 0.375 inches, a dimension 170 of 0.4375 inches, a dimension 172 of 0.75 inches, a dimension 174 of 2.5 inches, a dimension 176 of 0.5 inches, a dimension 178 of 0.75 inches, a dimension 180 of 0.5 inches, a dimension 182 and 184 of 0.375 inches, a dimension 186 and 188 of 0.4375 inches, a dimension 190 of 1.25 inches, a dimension 192 of 0.75 inches, a dimension 194 of 1.1875 inches, and a dimension 196 of 1.5 inches. Further, lines 198 and 200 denote the center line for the guide roller 304 (see FIG. 6) during its upward and downward movement. Moreover, line 199 denotes the center line of the pin rack which may be 4.0625 inches from the side frame 102 surface as noted by dimension 201.

Preferably, the track 140 is formed of nonmetallic material such as fiberglass. The fiberglass may be isophthalic polyester reinforced with 55% glass fibers by weight. Further, the fiberglass may have a longitudinal tensile strength of 47,500 P.S.I. and a transverse tensile strength of 7,000 P.S.I. Moreover, the modulus of elasticity is preferably at least $3.5 \times 10^6$ P.S.I. and the weight of the fiberglass may be 17.82 lbs/ft. The track 140 is preferably extruded.

As shown in FIG. 2, bolts 138 secure the track 140 to the side frame 102. Further, a pin rack mounting bolt 139 may be used to hold the pin rack to the side frame 102 as is standardly done in the industry.

Figure 3:
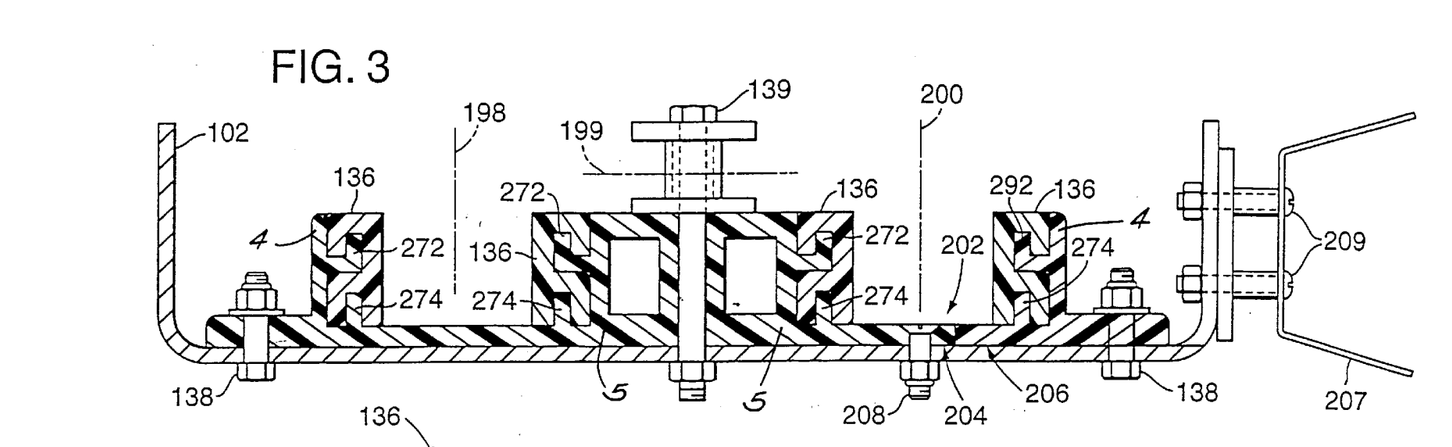
FIG. 3 is a cross sectional view of a removable cog screen track, side frame, and power track trough.

Referring now to FIGS. 1 and 3, there is shown a cross sectional view of the removable cog screen track 202 of the removable module 120. Similar components are labeled similarly for purposes of clarity.

The removable cog screen track 202 comprises a first portion 204 and a second portion 206. The dimensions of the removable cog screen track 202 are similar to the track 140 except for the fact that the removable cog screen track is formed of the two portions 204 and 206. Further, a bolt 208 secures the first portion 204 to the side frame 102 at one end of the first portion 204 disposed near the second portion 206 as shown. The removable cog screen track 202 is preferably formed of the same material as the track 140. This module 120 is removable as shown in order to easily allow removal of a drive carriage from the track 202.

There is also shown in FIG. 3 a power track trough 207 as is used in the industry. The power track trough 207 may be formed, for example, of fiberglass or stainless steel. The modules or side frame may be secured to the trough 207 by the use of fasteners 209. Although the trough 207 is shown as being secured to side frame 120, it may be similarly secured to the other modules forming the guide track 100.

Figure 4:
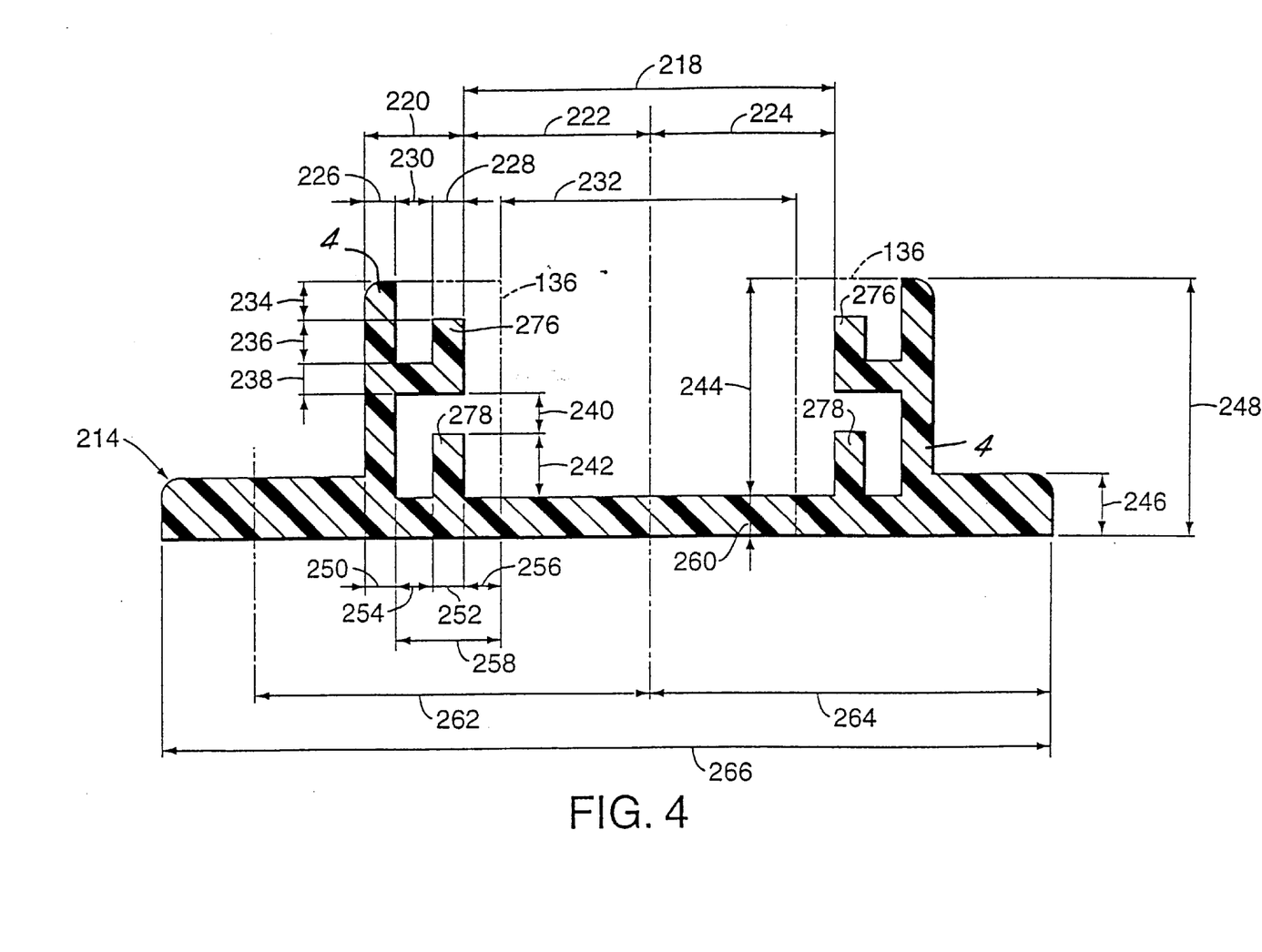
FIG. 4 is a cross sectional view of a cog screen upper track.

Now referring also to FIG. 4, there is shown a cross sectional view of the cog screen upper track 214. The upper track 214 may be used in conjunction with the upper track module 134. Further, the upper track 214 may be used in conjunction with the bridging track module 130. However, as shown in FIG. 1, a portion 216 of the track 214 is removed to allow for proper movement of the flap plate 126 to be described.

The upper track 214 may, for example, have a dimension 218 of 4.40625 inches, a dimension 220 of 1.1875 inches, a dimension 222 and 224 of 2.203125 inches, a dimension 226 and 228 of 0.375 inches, a dimension 230 of 0.4375 inches, a dimension 232 of 3.53125 inches, a dimension 234 of 0.4375 inches, a dimension 236 of 0.5 inches, a dimension 238 of 0.375 inches, a dimension 240 of 0.4375 inches, a dimension 242 of 0.75 inches, a dimension 244 of 2.5 inches, a dimension 246 of 0.75 inches, a dimension 248 of 3.0 inches, a dimension 250 and 252 of 0.375 inches, a dimension 254 and 256 of 0.4375 inches, a dimension 258 of 1.25 inches, a dimension 260 of 0.5 inches, a dimension 262 of 4.75 inches, a dimension 264 of 4.875 inches, and a dimension 266 of 10.75 inches.

Preferably, the upper track 214 is also formed of nonmetallic material such as fiberglass. The fiberglass may be isophthalic polyester reinforced with 55% glass fibers by weight. Further, the fiberglass may have a longitudinal tensile strength of 47,500 P.S.I and a transverse tensile strength of 7,000 P.S.I. Moreover, the modulus of elasticity is preferably at least $3.5 \times 10^6$ P.S.I and the weight of the fiberglass may be 7.30 lbs/ft.

Figure 5:
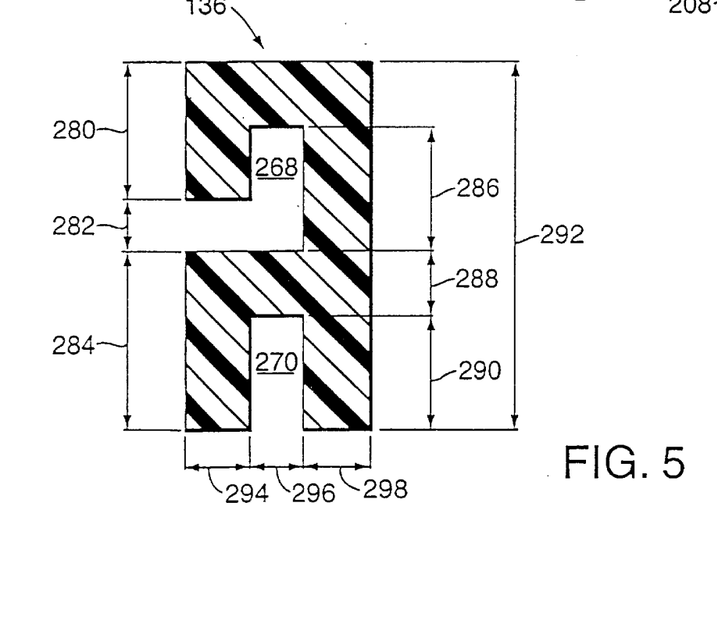
FIG. 5 is a cross sectional view of a wear bar.

Now referring to FIG. 5, there is shown a cross sectional view of the view of the wear bar 136 of FIG. 1. As seen, the wear bar 136 may have a lambda-shaped cross section. The wear bar 136 may form a first groove 268 and a second groove 270. As best seen in FIGS. 1 through 3, the first and second grooves 268 and 270 of the wear bar 136 are received by lips or extensions 272 and 274 of ribs 4 or 5 in the tracks 140 or 202. Similarly, as shown in FIG. 4, the first and second grooves 268 and 270 of the wear bar 136 are received by lips or extensions 276 and 278 of ribs 4 in the upper track 214. The wear bar 136 may be slidably received onto the tracks 140, 202, and 214 of the given modules or sections. As a result, the wear bar 136 is secured to the track without the use of fasteners. Further, the bottom tracking ring 122, the top tracking ring 124, and the flap plate 126 trap the wear bar 136 in place so that the wear bar 136 does not slide out of its proper position.

Figure 6:
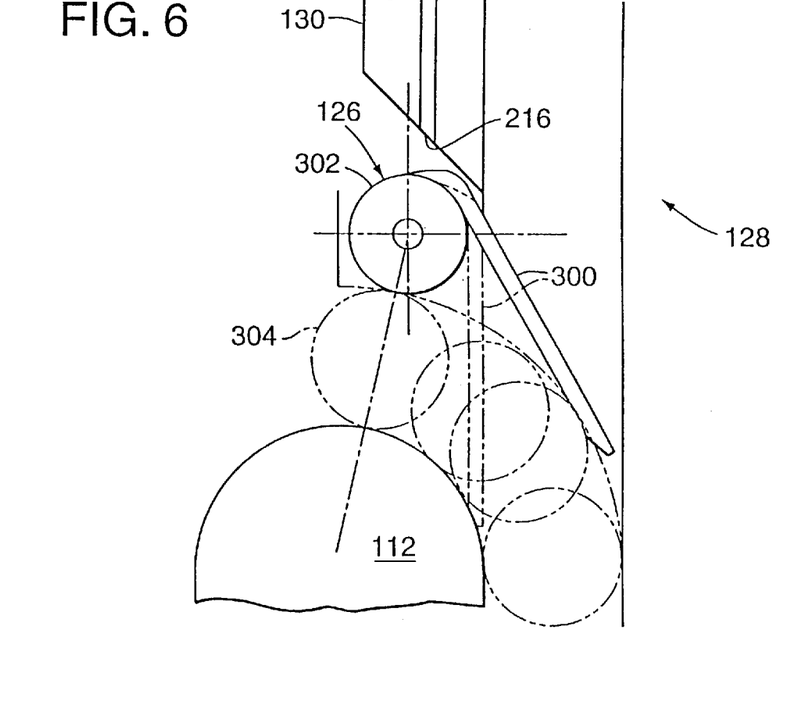
FIG. 6 is an end view of the cooperation of a flap plate with an upper track round and a bridging track module, the flap plate being shown in both an open and closed state.

As shown in FIG. 1 through 3, the tracks 140 and 202 comprise four lips 272 and four lips 274 for receiving four corresponding wear bars 136. One pair of wear bars 136 is for the downward movement of the guide roller 304 (FIG. 6) and a second pair of wear bars is for the upward movement of the guide roller 304 (FIG. 6). Moreover, as shown in FIGS. 1 and 4, the upper track 214 comprises two lips 276 and two lips 278 for receiving two corresponding wear bars 136.

The wear bar 136 may have a dimension 280 of 0.9375 inches, a dimension 282 of 0.375 inches, a dimension 284 of 1.1875 inches, a dimension 286 of 0.875 inches, a dimension 288 of 0.4375 inches, a dimension 290 of 0.75 inches, a dimension 292 of 2.5 inches, a dimension 294 of 0.4375 inches, a dimension 296 of 0.375 inches, and a dimension 298 of 0.4375 inches. The wear bar is preferably formed of UHMW polyethylene extruded virgin material with a molecular weight of 4.0 million or greater and a relative abrasion resistance of twelve, an intrinsic viscosity of twenty four or greater, and a water absorption of zero. Further, the wear bar 136 material should also be in accordance with ASTM standard D-4020-81 and the straightness of the wear bar 136 length should be plus or minus one-eighth-of-an-inch per ten feet of material.

The tracking rings 122 and 124 as well as the track rounds 112 and 114 are preferably molded or machine parts formed by Nylatron GSM Blue moly-filled nylon as supplied in raw material by Polymer Corporation of Reading, Pa. Further, the track offset 132 which may be molded or machined as well may be formed of Nylatron GSM Blue or the same UHMW polyethylene material as the wear bar 136.

FIG. 6 is an internal sideframe view of the cooperation of the flap plate 126, which may be of a non-metallic material such s Nylatron GMA Blue, with the track round 112 and the bridging track module 130, the flap plate 126 being shown in its open and closed state. As seen, the flap plate 126 comprises an arm 300 and a roller 302. In the open state, the guide roller 304 completes its upward path and returns around the track round 112 to once again go down its downward path. In the closed state, the follower shaft mounted guide roller 304 returns up the upper track section. As seen in FIG. 6, a portion 216 of the track 214 in the bridging track module 130 is removed to allow for proper movement of the flap plate 126 from its open to its closed state.

Figure 7:
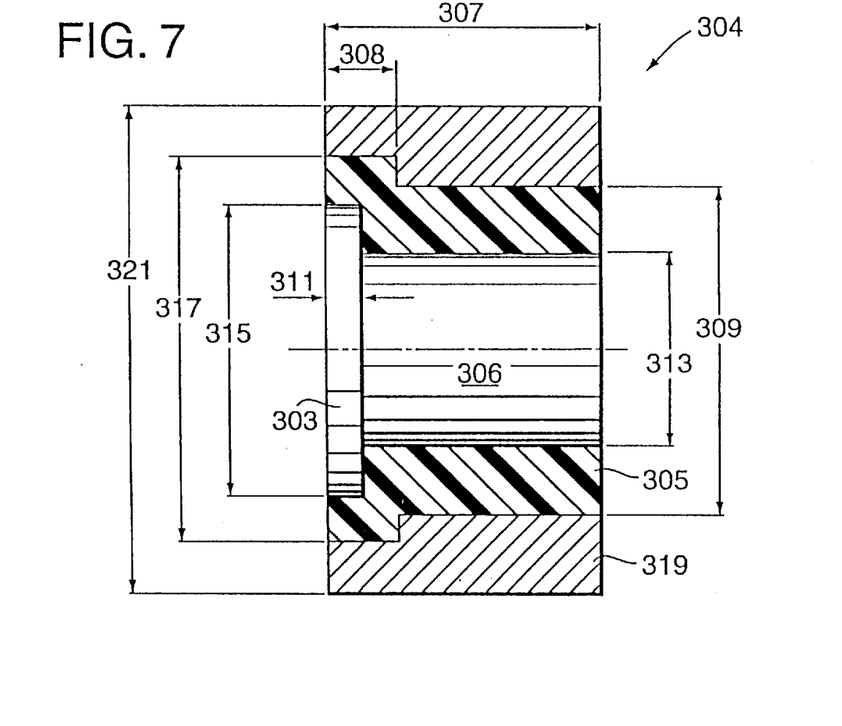
FIG. 7 is a cross sectional view of a guide roller assembly.

Referring to FIG. 7, the guide roller 304 may, for example, be formed of a ring 305 of nonmetallic low-friction polymeric material, preferably, Nylatron GSM Blue which surrounds a pin 306 having an extension 303 attached to the end of a torque tube support shaft, not shown. The ring of Nylatron may freely rotate around the pin while guiding the guide roller within the guide tracking 100. The guide roller 304 may have a dimension 307 of 1.9375 inches, a dimension 308 of 0.5 inches, a dimension 309 of 2.38 inches, a dimension 311 of 0.25 inches, a dimension 313 of 1.379 inches, a dimension 315 of 2.125 inches, and a dimension 317 of 2.756 inches. Moreover, the guide roller 304 may further have an exterior sleeve of stainless steel 319 surrounding the liner 305 of Nylatron to further strengthen the guide roller assembly 304. The outer diameter 321 of the guide roller 304 may, for example, be 3.502 inches. The guide roller may also merely have a ring of Nylatron surrounding the pin without any steel ring. Alternately, the guide roller 304 may be of any conventional design.

The length of the standard intermediate module 116 may, for example, be four feet in order to provide lengths appropriate to proper tooling fixtures and be able to hold tolerancing. Further, four foot sections of modules may be more easy to handle and stock. The variable intermediate modules 118 may be longer or shorter in length than the standard intermediate modules 116 in order to allow for different desired final lengths for the cog rake bar screen track 100. The wear bars 136 are, in turn, the same length as the modules.

Wear bars 136 are utilized in the embodiment shown in FIG. 1 where a nonmetallic track is employed. This is due to the fact that nonmetallic surfaces such as fiberglass are non-wearing surfaces. In order to prolong the life of the track, wear bars may thus be employed. Where, however, the track is formed of metallic material such as stainless steel, then it is generally not necessary to use wear bars 136 because steel is a wearing surface.

Where the guide tracking 100 is formed of nonmetallic material, the tracking may be more corrosion resistant. As a result, the use of such nonmetallic material may help eliminate some of the maintenance needed on metallic tracking.

Figure 8:
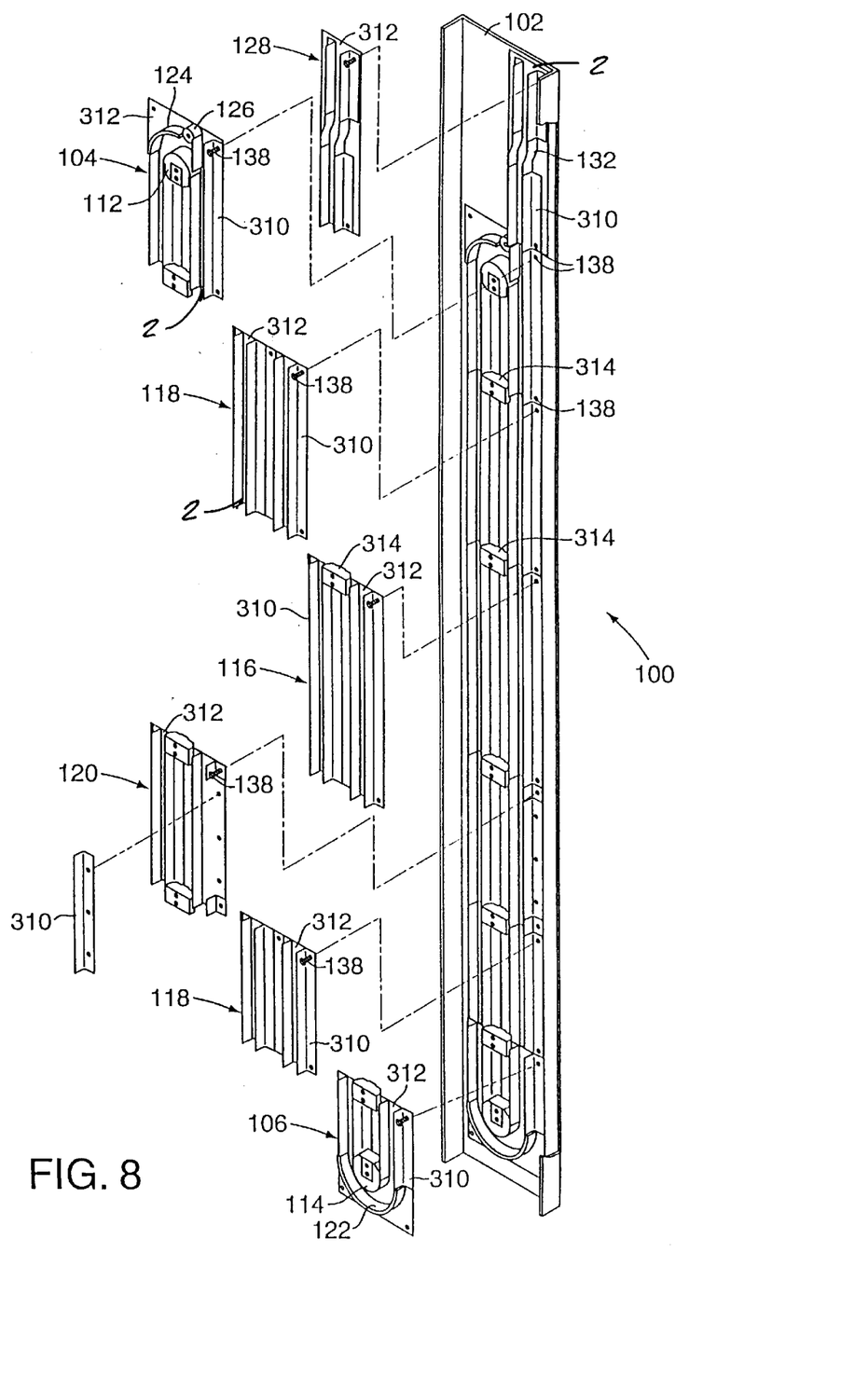
FIG. 8 is an alternate embodiment of the guide tracking for a cog rake bar screen.

Referring now to FIG. 8, there is shown an alternate embodiment of the guide tracking 100 for a cog rake bar screen. Similar components have been labeled similarly for purposes of clarity. In the alternate embodiment shown in FIG. 8, the guide tracking 100 is preferably made of metal, such as carbon steel 304 or 316 stainless steel. Also, the track rounds 112, 114, the tracking rings 122 and 124, and the flap plate 126 may, for example, be made of carbon steel 304, 316 stainless steel, or cast iron.

Steel angle irons 310 may be secured to a bed plate 312 for each given module. The angle irons 310 may be secured via welding to the bed plate 312 and the bed plate 312 may, in turn, be secured to the side plate 102 via bolts 138. The angle irons 310 define therebetween an elongated channel 2 in each section similar to the elongated channels 2 shown and described in reference to FIG. 1. Guide rollers 304 move within the elongated channels of FIG. 8 in the same manner as that described hereinabove with regards to FIG. 1. As is standardly used in the industry, spacer blocks 314 may be used to support the pin rack. These spacer blocks 314 may also be made of non-metallic materials such as Nylatron if fixtures are used to make the modules. Otherwise, the spacer blocks 314 may be made of metal and may be welded inside the guide track angles to help the overall stiffness of the frame and pin rack assembly the drive carriage traverses on.

In the upper pin module 104, the track round 112, and the tracking ring 124, may be appropriately welded to the bed plate 312 for that module. Similarly, in the bottom pin module 106, the track round 114 and the tracking ring 122 may be welded to the bed plate 312 for that module. Further, the upper track section 128 may comprise a variable offset module 316 with a track formed by angle irons 310 or flat bars as well as a variable offset 132.

Whether the guide tracking 100 is nonmetallic or metallic, the use of modules helps facilitate removal and replacement of only those sections of the guide tracking in need of repair. Further, the use of modules may make it easier to install replacement guide tracking at the wastewater treatment site.

Figure 9:
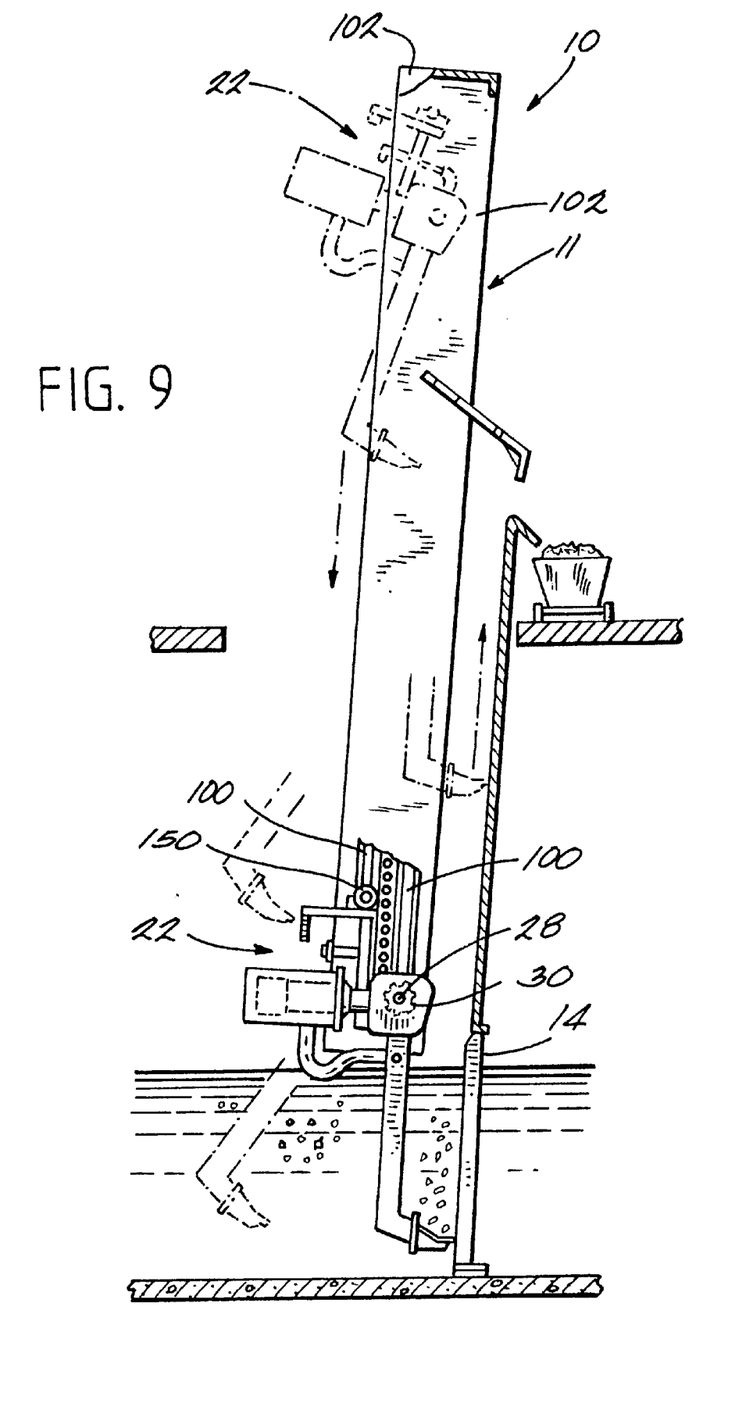
FIG. 9 is a side elevational view, with portions broken away, of a typical cog rake bar screen wherein the guide tracking according to the present invention may be utilized.

Referring now to FIG. 9, there is shown a cog rake bar screen for use in a wastewater treatment facility in which guide tracking according to the present invention may be utilized. A cog rake bar screen 10 has an inverted U-shaped frame 11, including side frame members 102 mounted over a water-carrying channel and adjacent to an upstream side of a bar rack 14. Sections or modules of guide tracking 100 according to the present invention may be secured to side frame 102. A rake and drive assembly, indicated generally at 22 and more fully described in U.S. Pat. No. 5,246,573, is provided. Cog wheels 30 are secured to a drive shaft 28. Cog wheels 30 cooperate with guider rollers 304, previously described, such that rotation of the cog wheels 30 will cause the entire rake and drive assembly 22 to ascend or descend in guide tracking 100 of the cog rake bar screen 10. The ascending and descending motion of the rake and drive assembly 22 will remove debris in a wastewater treatment facility as can be appreciated by those skilled in the art. U.S. Pat. No. 5,246,573 describes in more detail the operation of a typical rake and drive assembly and its many parts.

As described in the Background of the subject application, prior cog rake bar screens utilize guide tracking which is generally shop fit and accurately welded into place inside a main side frame. Such manufacture results in a single one piece guide track. If failure occurs in any area of such a guide tracking system, replacement of the entire side frame and guide tracking becomes necessary. As noted, the use of modular sections according to the present invention helps facilitate replacement of only those sections of the guide tracking in need of repair. In this way, the use of modular sections makes it easier than heretofore possible to install replacement guide tracking sections at a wastewater treatment facility.

As further previously mentioned, if frames are not accurately manufactured, the cog rake drive carriage operating within the guide track may run very rough, vibrate significantly, or worse, potentially jam, thereby leading to the problems set-forth above. Because prior cog rakes require welding guide tracks in a single piece inside the main side frame, typically such guide track pieces are 30 to 40 feet long, fabrication tolerances are not significantly stringent. As a result, problems associated with the cog rake drive carriage, as previously noted herein, may occur. The use of modular sections according to the preset invention allows for improved fabrication tolerances of the overall guide truck because the smaller, modular sections are easier to manufacture and assemble than the single one-piece welded tracking of the prior art. Moreover, in the case of a non-metallic design, nonmetallic components such as top and bottom rounds, pin rack support blocks, offset sections, tracking rings and flap plates may be bolted in place therby also allowing for improved tolerance control. Additionally, non-metallic modular sections may be made of pultruded fiberglass. Tolerances for pultruded fiberglass can be much more stringent than tolerances allowed for single one-piece welded overall designs of the prior art guide tracks. As a result, because modular sections, according to the present invention, allow for improved fabrication tolerances, operation of the cog rake drive carriage within the guide track will be greatly improved.

It should be recognized that, while the present invention has been described in relation to the preferred embodiments thereof, those skilled in the art may develop a wide variation of structural details without departing from the principles of the invention. Therefore, the appended claims are to be construed to cover all equivalents falling within the true scope and spirit of the invention.

What is claimed is:

1. A guide track for use in a cog rake bar screen of a water treatment facility, the cog rake bar screen including a guide roller moveable within the guide track, said guide track comprising:

a frame; and at least two modular sections disposed adjacent one another and each modular section removably attached to said frame, said modular sections defining an elongated channel for housing the guide roller for movement within the guide track.

2. The guide track according to claim 1, wherein at least one of said modular sections is formed of metallic material.

3. The guide track according to claim 1, wherein at least one of said modular sections is formed of nonmetallic material.

4. The guide track according to claim 3, wherein at least one of said modular sections further comprises a rib extending from a flat surface of said modular section, the rib further having an extension; and a wear bar, said wear bar having a groove, the groove of said wear bar mating with the extension of the rib of said modular section in order to secure said wear bar to said modular section.

5. The guide track according to claim 4, wherein said wear bar is secured to said nonmetallic track without the use of fasteners.

6. The guide track according to claim 5, wherein said wear bar is slidably received onto said nonmetallic track.

7. The guide track according to claim 5, wherein said wear bar is lambda-shaped in cross-section.

8. The guide track according to claim 4, wherein said wear bar comprises UHMW polyethylene.

9. The guide track according to claim 3, wherein said nonmetallic material comprises fiberglass.

10. The guide track according to claim 1, wherein each modular section is made of metallic material.

11. The guide track according to claim 1, wherein each modular section is made of nonmetallic material.

12. The guide track according to claim 11, wherein said nonmetallic material comprises fiberglass.

13. A guide track for use in a cog rake bar screen of water treatment facility, the cog rake bar screen including a guide roller movable within the guide track, said guide track comprising:

a u-shaped frame, said frame including a flat planer surface; and at least two modular sections disposed adjacent one another and each modular section removably attached to the flat planar surface of said frame, said modular sections further comprising at least two spaced-apart ribs extending from a flat surface of said modular sections, the spaced apart ribs defining an elongated channel for housing the guide roller for movement within the guide track.

14. The guide track according to claim 13, wherein at least one of said modular sections is formed of metallic material.

15. The guide track according to claim 13, wherein at least one of said modular sections is formed of nonmetallic material.

16. The guide track according to claim 15, wherein the ribs of said modular sections each contain a respective extension; and a plurality of wear bars, each wear bar having a groove, the groove of each wear bar mating with the respective extension of the rib of said modular sections in order to secure said wear bars to said respective modular sections.

17. A cog rake bar screen of a water treatment facility, said cog rake bar screen comprising:

a frame;

a rake and drive assembly, said rake and drive assembly including a guide roller and a guide track, said guide track including:

at least two modular sections disposed adjacent one another and each modular section removably attached to said frame, said modular sections defining an elongated channel for housing the guide roller for movement along the guide track, the movement of the guide roller causing the rake and drive assembly to properly move and function within said guide track.

* * * * *